July 1, 1952 R. M. M. OBERMAN 2,602,117
LINE ADAPTING TELEGRAPH REPEATER
Filed Aug. 6, 1947
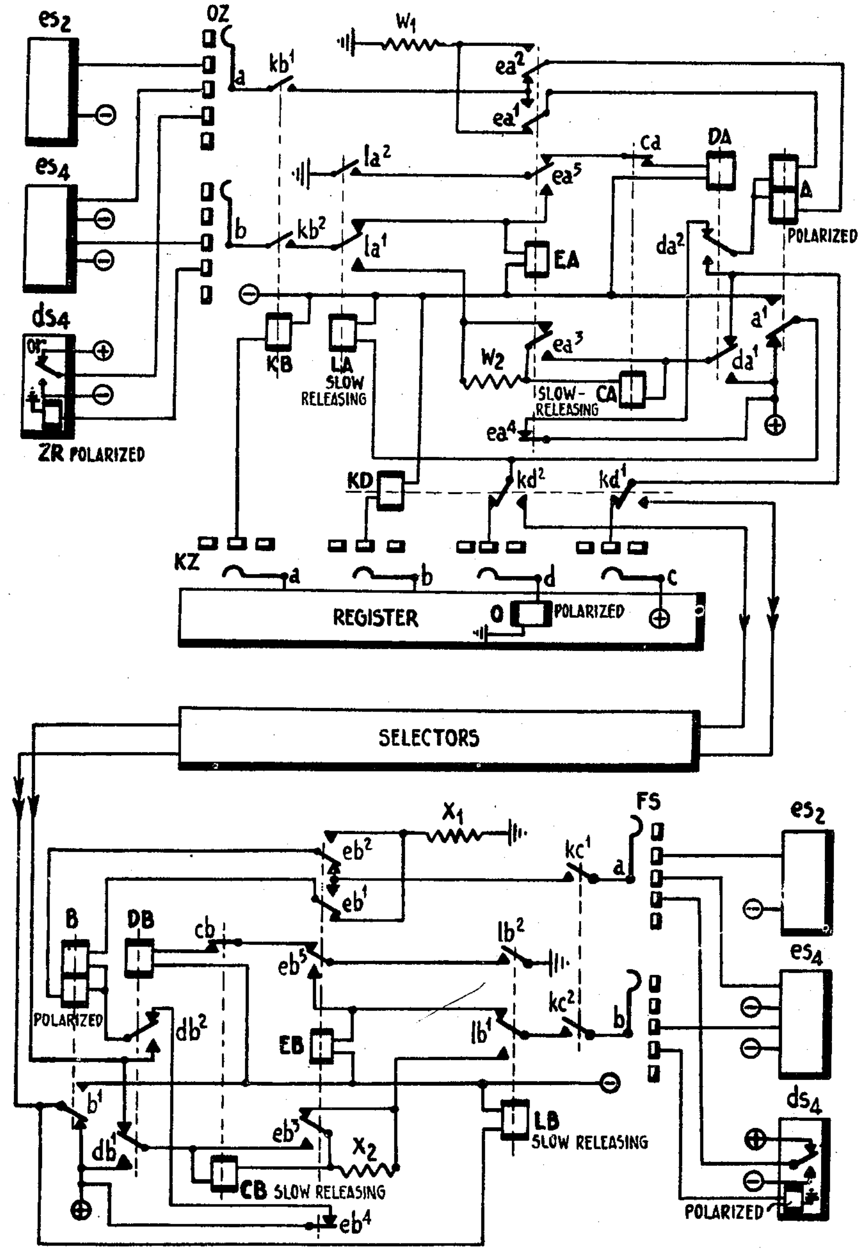
INVENTOR.
Roelof Maarten Maria Oberman
BY
[signature]

Patented July 1, 1952

2,602,117

UNITED STATES PATENT OFFICE 2,602,117

LINE ADAPTING TELEGRAPH REPEATER

Roelof M. M. Oberman, The Hague, Netherlands

Application August 6, 1947, Serial No. 767,535
In the Netherlands September 2, 1943

Section 1, Public Law 690, August 8, 1946
Patent expires September 2, 1963

5 Claims. (Cl. 178—2)

The present invention relates to a signalling system, in particular a telegraph system, in which the junction lines of the subscriber's sets and the exchanges can be of different kind, e. g. single-current and double-current lines and can be through-connected in the exchange by means of repeaters which are adapted to the nature of the incoming and outgoing lines.

A system is known in which the lines are discriminated according to their nature in four-wire double-current lines, and two-wire single-current lines. Discriminating relays are provided for the adaptation of the repeater to the kind of line. These relays can be energized over a separate wiper of the finders or selectors by earthing a contact in the arch of the relevant outlet which may be a finder or selector.

A system has also been suggested with repeaters in the junction circuit of the exchange, which can adapt themselves to single-current two-wire and four-wire lines as well as double-current four-wire lines. As an individual compensation resistance which is only present in single-current lines is used as discriminating criterion between the single-current and the double-current lines, only three wipers are required at all the selectors and finders for the connection of the repeater.

The system according to the present invention aims at an improvement in the arrangement of the repeaters in such systems by deriving the discriminating criterion from the transmission wires themselves.

In this way the number of wipers at the finders and selectors necessary for the arrangement of the repeater can be restricted to two. As a result of this, e. g. normal two-motion selectors with three wiper branches can be provided in the system according to the invention.

Further, the discriminating criterion for the nature of the incoming or outgoing line, which is derived from one transmission wire can also serve as check on the actual presence of that wire. The other transmission wire can also be checked in such a manner so that, if in consequence of a fault the discriminating criterion is not supplied, or is supplied wrongly, or if one of the transmission wires is out of order, the connection cannot be built up further. An alarm can be provided which gives notice of such a fault.

It is to be understood that in the system according to the present invention, the repeaters in the exchange, which in a manual system can be semi-automatic or fully automatic, not only adapt themselves to the kind of lines to the subscriber's sets, but also to the kind of lines between the applied exchanges.

The invention will be described in detail with reference to the accompanying drawing which only shows the diagrams of a register exchange so far as necessary for an understanding of the invention.

The drawing shows a part of an automatic exchange having a register. In the upper left corner of the drawing three different kinds of incoming lines have been indicated, i. e. a single-current two-wire line *es2*, a single-current four-wire line *es4* and a double-current four-wire line *ds4*. The incoming lines are connected to contact banks of a call finder OZ, the transmission wipers *a* and *b* of which are connected to one side of the repeater. The output of this side is formed by two conductors provided with arrows, which conductors, in cooperation with the register, form a junction circuit leading over selectors indicated by a label to the other side of the repeater, the latter being in substance equal to the first side. In a way similar to that in which the incoming lines are connected to the call finder OZ on the first side of the repeater, the outgoing lines are connected to a final selector FS on the other side of the repeater. As the operation of the other side of the repeater is substantially equal to that of the first side of the repeater, it will not be described more in detail.

An incoming subscriber's call, which is characterized at the single-current lines by a line closure, and at the double-current lines by the transmission of a + voltage, occupies in known manner, which is not shown in the drawing, a free junction circuit and a free register.

Then the relay KB is energized by the register, after which a contact of the relay KB operates the cut-off relay of the calling subscriber (not shown) and the calling line is through-connected to the contacts of the banks of the call finder. Then the contact *kb2* of the relay KB through-connects the *b*-wiper of the call finder over the contact *ta1* to the testing relay EA, which is operated in the manner hereinafter described.

The contacts of the *a*-bank of the call finder OZ and of the *a*-banks of the final selector FS on the other side of the repeater are connected, for single-current two-wire lines to the joint transmission and receiving circuit, and for four-wire single-current and double-current connections to the transmission circuit of the subscriber or of the other exchange.

The contacts in the *b*-banks of the call finders, selectors, and final selector are not connected when single-current two-wire connections are applied. When for four-wire single-current and four-wire double-current circuits are applied, the contacts are connected, in order to provide a circuit between the calling subscriber and either a subscriber or another exchange to be called.

The discriminating criterion for the kind of the line can be derived either from the wire terminating at the *a*-bank or from the wire terminating at the *b*-bank.

When a single-current line calls, minus voltage is applied to the relevant contact in the *a*-bank, while a plus-voltage is applied when a double-current line calls. The contacts in the *b*-bank are not connected for single-current connections or connected with minus battery, while these contacts are connected to ground for double-current connections. A discriminating relay can be energized at one of these criteria.

To check the presence of the transmission wires advantageously use can be made of the discriminating criterion over the *b*-wiper. The relay EA is provided for this purpose. The winding of this relay is connected with one end to minus battery, so that it can be energized only if the call finder is, with the *b*-wiper of the call finder OZ situated at an outlet which is connected to ground, i. e. a double-current outlet.

It would be possible to switch through the circuit over the *b*-wiper of the call finder OZ to the repeater after a short delay of time, which is sufficient for the operation of the relay EA. However, such a switching operation would not be compulsory so that an incorrect position of the repeater would result in case of a defect of the wire connected to the *b*-wiper.

The system according to my present invention renders the further succession of the switchings compulsory.

The armature $a^1$ of the polarized transmission relay A is kept during the normal position of the junction circuit in the position in which it rests against the minus pole of the battery, relay A being energized in a circuit formed over the plus pole of the battery, the contacts *ea*4 and *da*2, the upper winding of the relay A, the contact *ea*1 and the resistance W1 to ground. The resistance W1 serves as local compensation resistance for the relay A, and at the same time as current limiter for this relay when actuated under double-current conditions.

A guarding relay LA supervised by the armature $a^1$ is released in the normal position of the junction circuit. The contact *kb*1 through-connects the transmission wire of the *a*-wiper to the lower winding of the relay A. Since a single-current transmission wire leading over a subscriber's set terminates again in the exchange at minus battery in case such a wire is switched in, the lower winding of the polarized relay A will be so energized that the armature $a^1$ is applied to the plus pole of the battery. The relay LA attracts its armature and with the contact *la*1 through-connects the wire over the *b*-wiper to the repeater. The relay EA was not energized in this case.

If, however, over the contacts *kb*1 and *kb*2 a double-current line is connected to the repeater, the relay EA operates. As long as the relay EA however, is released, the polarized relay A cannot mover over its armature $a^1$ against the plus pole of the battery, since no current flows through the lower coil of this relay, because the contact or of the calling line rests against the plus pole of the battery. However, as soon as the relay EA is operated, its change-over contacts *ea*1 and *ea*2 switch the circuit of the polarized relay A, the armature $a^1$ is placed against the plus pole of the battery. The relay LA operates and with the contact *la*1 connects the *b*-wire to the repeater, while with the contact *la*2, a holding circuit is formed for the relay EA. The relay LA is a slow releasing guarding relay which cannot release before the armature $a^1$ has been resting during a certain time against the minus pole of the battery.

As well for single-current as for double-current circuits, the consecutive switchings take place in a compulsory manner. If after the operation of the relay KB during a period of time which is equal to the time of operation of the relay EA, the polarized relay A and the guarding relay LA, the latter is not operated, there is a fault which can be effectively announced by an alarm in a known manner. For the sake of completeness it is remarked that for single-current lines after the operation of the LA relay, the relay DA operates in a circuit from earth, over the contacts *la*2, *ea*5 and *ca*, and the winding of the relay DA to minus battery. The repeater, which in the normal position is in the single-current four-wire position, is then switched over by the contacts *da*1 and *da*2 into the single-current two-wire situation. If the subscriber indicates that on his side the four-wire situation of the line is desired, the circuit over the *b*-wiper in the subscriber's set is closed, and the relay CA is energized in a circuit of plus battery in the exchange, the contact *da*1, the relay CA, the contacts *la*3, *la*1, *kb*2, the *b*-wiper of call finder OZ, and the subscriber's line to minus battery in the exchange. Owing to the release of the contact *ca*, the relay DA is released.

The calling subscriber can now transmit the series of selecting impulses to the receiving relay O in the register, after which the establishment of the desired connection follows.

After this establishment and after the free test of the subscriber to be called the contacts *kc*1 and *kc*2 through-connect the *a*- and *b*-wipers of the final selector to the other side of the repeater (the lower side in the drawing) after which a similar switching as in the first side of the repeater (the upper side in the drawing) takes place. Hereafter the switching relay KD is energized from the register and holds itself by a contact (not shown) and switches the connection through by means of the contacts *kd*1 and *kd*2.

What I claim as new and desire to secure by Letters Patent is:

1. A signalling system, comprising in combination, a plurality of two-wire single-current lines; a plurality of four-wire single-current lines; a plurality of four-wire double-current lines; an exchange; a repeater in said exchange; means for adapting said repeater in said exchange automatically to any of said lines, said means including a relay discriminating between said single-current lines and said double-current lines; a first wiper and a first contact bank arranged for cooperation with said first wiper, said first contact bank having contacts connected, respectively, to said two-wire single-current lines, said four-wire single-current lines and said four-wire double-current lines; a second wiper and a second contact bank arranged for cooperation with said second wiper, said second contact bank including contacts connected, respectively, to said four-wire single-current lines and said four-wire double-current lines, said contacts of said second contact bank connected to said four-wire single-current lines having a polarity different from the polarity of said contacts of said second contact bank connected to said four-wire double-current lines; means for imparting to one end of said discriminating relay a polarity being equal to the polarity of said four-wire single-current lines connected to said contacts of said second contact bank; and means for connecting the other end of said discriminating relay to said second wiper, whereby said discriminating relay is in an open circuit when said wipers are in contact with contacts of said contact banks belonging to said two-wire single-current lines, and connected with both ends to the same polarity when said wipers are in contact with contacts of said contact banks belonging to said four-wire single-current lines, and connected with one end to one polarity and with the other end to a different polarity when said wipers are in contact with contacts of said contact banks belonging to said four-wire double-current lines so that said discriminating relay discriminates between said two-wire and four-wire single-current lines by being de-energized and said four-wire double-current lines by being energized.

2. A signalling system, comprising in combination, a plurality of two-wire single-current lines; a plurality of four-wire single-current lines; a plurality of four-wire double-current lines; an exchange; a repeater in said exchange; means for adapting said repeater in said exchange automatically to any of said lines, said means including a relay discriminating between said single-current lines and said double-current lines; a first wiper and a first contact bank arranged for cooperation with said first wiper, said first contact bank having contacts connected, respectively, to said two-wire single-current lines, said four-wire single-current lines and said four-wire double-current lines; a second wiper and a second contact bank arranged for cooperation with said second wiper, said second contact bank including contacts connected, respectively, to said four-wire single-current lines and said four-wire double-current lines, said contacts of said second contact bank connected to said four-wire single-current lines having a negative polarity, the polarity of said contacts of said second contact bank connected to said four-wire double-current lines being the polarity of ground; means for imparting to one end of said discriminating relay a negative polarity being equal to the negative polarity of said four-wire single-current lines connected to said contacts of said second contact bank; and means for connecting the other end of said discriminating relay to said second wiper, whereby said discriminating relay is in an open circuit when said wipers are in contact with contacts of said contact banks belonging to said two-wire single-current lines, and connected with both ends to negative polarity when said wipers are in contact with contacts of said contact banks belonging to said four-wire single-current lines, and connected with one end to negative polarity and with the other end to ground polarity when said wipers are in contact with contacts of said contact banks belonging to said four-wire double-current lines so that said discriminating relay discriminates between said two-wire and four-wire single-current lines by being deenergized and said four-wire double-current lines by being energized.

3. A signalling system, comprising in combination, a plurality of two-wire single-current lines; a plurality of four-wire single-current lines; a plurality of four-wire double-current lines; an exchange; a repeater in said exchange; means for adapting said repeater in said exchange automatically to any of said lines, said means including a relay discriminating between said single-current lines and said double-current lines; a first wiper and a first contact bank arranged for cooperation with said first wiper, said first contact bank having contacts connected, respectively, to said two-wire single-current lines, said four-wire single-current lines and said four-wire double-current lines; a second wiper and a second contact bank arranged for cooperation with said second wiper, said second contact bank including contacts connected, respectively, to said four-wire single-current lines and said four-wire double-current lines, said contacts of said second contact bank connected to said four-wire single-current lines having a polarity different from the polarity of said contacts of said second contact bank connected to said four-wire double-current lines; means for imparting to one end of said discriminating relay a polarity being equal to the polarity of said four-wire single-current lines connected to said contacts of said second contact bank; means for connecting the other end of said discriminating relay to said second wiper; a slow releasing relay; and a contact controlled by said slow releasing relay and having a first end position and a second end position, said contact forming in the first end position thereof part of said means connecting the other end of said discriminating relay to said second wiper, said contact connecting in the other end position thereof said second wiper to said repeater, whereby said discriminating relay is in an open circuit when said wipers are in contact with contacts of said contact banks belonging to said two-wire single-current lines, and connected with both ends to the same polarity when said wipers are in contact with contacts of said contact banks belonging to said four-wire single-current lines, and connected with one end to one polarity and with the other end to a different polarity when said wipers are in contact with contacts of said contact banks belonging to said four-wire double-current lines so that said discriminating relay discriminates between said two-wire and four-wire single-current lines by being de-energized and said four-wire double-current lines by being energized.

4. A signalling system, comprising in combination, a plurality of two-wire single-current lines; a plurality of four-wire single-current lines; a plurality of four-wire double-current lines; an exchange; a repeater in said exchange; means for adapting said repeater in said exchange automatically to any of said lines, said means including a relay discriminating between said single-current lines and said double-current lines; a first wiper and a first contact bank arranged for cooperation with said first wiper, said first contact bank having contacts connected, respectively, to said two-wire single-current lines, said four-wire single-current lines and said four-wire double-current lines; a second wiper and a second contact bank arranged for cooperation with said second wiper, said second contact bank including contacts connected, respectively, to said four-wire single-current lines and said four-wire double-current lines, said contacts of said second contact bank connected to said four-wire single-current lines having a polarity different from the polarity of said contacts of said second contact bank connected to said four-wire double-current lines; means for imparting to one end of said discriminating relay a polarity being equal to the polarity of said four-wire single-current lines connected to said contacts of said second contact bank; means for connecting the other end of said discriminating relay to said second wiper; a slow releasing relay; a contact controlled by said slow releasing relay and having a first end position and a second end position, said contact forming in the first end position thereof part of said means connecting the other end of said discriminating relay to said second wiper, said contact connecting in the other end position thereof said second wiper to said repeater; and a polarized relay including a contact controlling said slow releasing relay, whereby said discriminating relay is in an open circuit when said wipers are in contact with contacts of said contact banks belonging to said two-wire single-current lines, and connected with both ends to the same polarity when said wipers are in contact with contacts of said contact banks belonging to said four-wire single-current lines, and connected with one end to one polarity and with the other end to a different polarity when said wipers are in contact with contacts of said contact banks belonging to said four-wire double-current lines so that said discriminating relay discriminates between said two-wire and four-wire single-current lines by being de-energized and said four-wire double-current lines by being energized.

5. A signalling system, comprising in combination, a plurality of two-wire single-current lines; a plurality four-wire single-current lines; a plurality of four-wire double-current lines; an exchange; a repeater in said exchange; means for adapting said repeater in said exchange automatically to any of said lines, said means including a relay discriminating between said single-current lines and said double-current lines; a first wiper and a first contact bank arranged for cooperation with said first wiper, said first contact bank having contacts connected, respectively, to said two-wire single-current lines, said four-wire single-current lines and said four-wire double-current lines; a second wiper and a second contact bank arranged for cooperation with said second wiper, said second contact bank including contacts connected, respectively, to said four-wire single-current lines and said four-wire double-current lines, said contacts of said second contact bank connected to said four-wire single-current lines having a polarity different from the polarity of said contacts of said second contact bank connected to said four-wire double-current lines; means for imparting to one end of said discriminating relay a polarity being equal to the polarity of said four-wire single-current lines connected to said contacts of said second contact bank; means for connecting the other end of said discriminating relay to said second wiper; a slow releasing relay; a contact controlled by said slow releasing relay and having a first end position and a second end position, said contact forming in the first end position thereof part of said means connecting the other end of said discriminating relay to said second wiper, said contact connecting in the other end position thereof said second wiper to said repeater; a polarized relay including a contact controlling said slow releasing relay, said polarized relay having two windings; means for energizing one of said windings by a stronger current than the other of said windings when a single-current transmission route is established; and means for energizing both said windings in series to each other when a double-current transmission route is established, whereby said discriminating relay is in an open circuit when said wipers are in contact with contacts of said contact banks belonging to said two-wire single-current lines, and connected with both ends to the same polarity when said wipers are in contact of said contact banks belonging to said four-wire single-current lines, and connected with one end to one polarity and with the other end to a different polarity when said wipers are in contact with contacts of said contact banks belonging to said four-wire double-current lines so that said discriminating relay discriminates between said two-wire and four-wire single-current lines by being de-energized and said four-wire double-current lines by being energized.

ROELOF M. M. OBERMAN.

REFERENCES CITED

The following references are of record in the file of this patent:

FOREIGN PATENTS

| Number | Country | Date |
|---|---|---|
| 531,902 | Great Britain | Jan. 14, 1941 |